US006292900B1

(12) United States Patent
Ngo et al.

(10) Patent No.: US 6,292,900 B1
(45) Date of Patent: Sep. 18, 2001

(54) MULTILEVEL SECURITY ATTRIBUTE PASSING METHODS, APPARATUSES, AND COMPUTER PROGRAM PRODUCTS IN A STREAM

(75) Inventors: Teodora Ngo, Palo Alto; Gary W. Winiger, Mountain View, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/203,010

(22) Filed: Nov. 30, 1998

Related U.S. Application Data

(63) Continuation-in-part of application No. 08/769,603, filed on Dec. 18, 1996, now Pat. No. 5,845,068.
(51) Int. Cl.[7] .................................................. G06F 12/14
(52) U.S. Cl. ................................. 713/200; 713/166
(58) Field of Search .................................. 713/200, 201, 713/202, 166, 150, 151, 152, 164; 709/229

(56) References Cited

U.S. PATENT DOCUMENTS

| | | | | |
|---|---|---|---|---|
| 5,075,884 | * | 12/1991 | Sherman et al. ...................... | 713/200 |
| 5,572,673 | * | 11/1996 | Shurts .................................. | 713/200 |
| 5,577,209 | * | 11/1996 | Boyle et al. ......................... | 713/201 |
| 5,692,124 | * | 11/1997 | Holden et al. ....................... | 713/201 |
| 5,845,068 | * | 12/1998 | Winiger ................................ | 713/200 |

* cited by examiner

Primary Examiner—James P. Trammell
Assistant Examiner—Pierre E. Elisca
(74) Attorney, Agent, or Firm—Beyer Weaver & Thomas

(57) ABSTRACT

A multilevel security attribute passing system on a computer operating under a multilevel operating system engaged in stream communications and enabling contemporaneously opening a plurality of sockets having the same port number while meeting the requirements of a predetermined security policy. The security attributes of received data are copied into a credentials structure identified by a pointer in an attribute structure. The security of a data node configured for data stream communication is specified by storing the security attributes of transferred data into a selected data structure and then pointing to the selected data structure with intervening transmission and attribute structures.

14 Claims, 11 Drawing Sheets

MULTILEVEL SECURITY ATTRIBUTE PASSING METHODS, APPARATUSES, AND COMPUTER PROGRAM PRODUCTS IN A STREAM

RELATED APPLICATIONS

This application is a continuation-in-part of U.S. patent application Ser. No. 08/769,603, filed on Dec. 18, 1996, now U.S. Pat. No. 5,845,068, respectively invented by Gary W. Winger, upon which priority is claimed.

BACKGROUND OF THE INVENTION

1. Technical Field

The present invention relates to multilevel port attribute passing methods, apparatuses, and computer program products operable in computer systems, and more particularly, to multilevel port attribute passing systems operable in operating systems utilizing multilevel multiple security levels in which security attributes are passed in a stream.

2. Background

Secure computer systems restrict information from unauthorized disclosure. Government secrecy systems ensure that users access only permitted information in accordance with predetermined security clearances. Other secure environments protect selected private information including payroll data and other sensitive company data including internal memoranda and competitive strategy documents.

To establish computer security for government or company systems, a security policy is adopted. The security policy establishes rules for managing, protecting and distributing sensitive information. A security policy is typically stated in terms of subject and objects. Subjects are active within a selected system and include users, processes, and programs, for example. Objects are the recipients of subject action, such as files, directories, devices, sockets, and windows. A security policy may set rules to determine whether a subject user has access to a particular object such as a file.

One well-known security system developed by David Bell and Leonard LaPadula in 1973 describes a multilevel secure computer system having access rules depending upon the security clearances of messaging processes. Security systems based upon access rules rely upon reference monitors which enforce authorized access relationships between subjects and objects of a system. A security kernel concept developed by Roger Shell in 1972 implements the reference monitor notion that all system activity is supervised in accordance with the system's security policy. The kernel accordingly mediates. A "trusted system" has sufficient hardware and software integrity to allow its use to simultaneously process a range of sensitive unclassified or classified information for a diverse set of users without violating access privileges.

Networks require that the security mechanism of a trusted system be able to control communication with the trusted systems. Previously, a network administrator typically had tight control over system connections with other systems. However, with the proliferation of interconnected networks and easy remote access and resource sharing, systems often cannot identify or trust the entire network.

Strategies for establishing security in network environments require labeling data with predetermined security attributes or sensitivity labels, information labels. This enables recognition of data sensitivity at other systems of a network. Because different networks support different security policies, these labels are not necessarily in the same format. In certain secure networks, each system may have a different kind of label. A user sensitivity label specifies the sensitivity level, or level of trust, associated with that user. A file's sensitivity label similarly specifies the level of trust that a user must have to be able to access the particular file. Mandatory access controls use sensitivity labels to determine who can access what information in a system. Together, labeling and mandatory access control implement a multilevel security policy—a policy for handling multiple information classifications at a number of different security levels within a single computer system.

Under mandatory access control, every subject and object in a system supporting mandatory access controls has a sensitivity label associated with it. A sensitivity label generally includes a classification and a set of categories or compartments. The classification system is typically hierarchical, including in a military security model, for example, multiple distinct levels, such as top secret, secret, confidential and classified. In a company environment, other classifications may be followed including labels such as company confidential, or company private.

Typically, for a subject to read an object, the subject's sensitivity level must dominate the object's sensitivity level. A subject's sensitivity label dominates the object's sensitivity label if the subject's classification is equal to or exceeds the classification of the object. Similarly, in order to write an object, the object's sensitivity level must dominate the subject's sensitivity level. In order for a subject to write to an object, the subject's sensitivity level must be equal to or less than the sensitivity level of the object or file. Consequently, in a current mandatory access system, in order for a subject to freely read and write to and from an object, both the subject and the object must have the same classification label. This is the fundamental rule by which an access control system works, and by which two-way communication may take place between trusted computer systems.

In current networked multilevel trusted systems, third-party applications have only limited support for operating effectively. In particular, when multiple processes having different sensitivity labels attempt to access the same object or resource, despite differences in security level, the operation may block. In the prior art diagram of FIG. 1, an application runs on a trusted system and attempts to access a resource (i.e., a file, an application, or a database) either on the same system or on another system in a network. For success, the security levels of resource and subject must necessarily be the same in order to permit two-way communication according to the applicable access control security mechanism.

In multilevel trusted systems of the prior art as shown diagrammatically in FIG. 1, access to a resource or a service (object) by a process (subject) running at a particular sensitivity level is restricted to objects in memory having the same sensitivity level as the requesting process, as mandated by the access control mechanism. Consequently, two-way communication is precluded where the subject and the object have different sensitivity labels. Once a requested application, service or resource is instantiated in computer memory, a sensitivity label is associated with the process, service, or resource, and access by other processes running applications which also desire to access the resource, but which have a different clearance, is denied.

Another technical problem arises, however, in the prior art system of FIG. 2 described below when a port on a receiving system remains open for a substantial period of time at a particular security classification, clearance level, or sensitivity label. This prevents users and systems having different clearances from accessing the same resource, when a port has already been opened and remains open under a different clearance. Since a port number is unique to a resource or third party system being accessed, the unavailability of that particular port effectively precludes other users or systems with different clearances from accessing the third party resource. This effectively renders the resource unavailable to applications operating at different security levels.

Accordingly, there is a need for systems and methods providing access to resources operating at multiple security levels. Such systems and methods must be transparent to processes having different security classification levels.

An additional problem with current multilevel trusted systems is security violations from interlevel signal channel communications between associated system ports or covert channels. A covert channel is an information path that is not ordinarily used for communication in a system and thus is not protected by the system's normal security mechanisms. Thus, there is a secret way to communicate information to another person or program in violation of security protocol. The covert channels convey information by changes in data attributes or by changes in system performance or timing. By monitoring attribute changes for stored data and system timing, confidential information may be inferred. Data characteristics such as message length, frequency, and destination may be protected from analysis of data traffic by an intruder or from a user having a lower classification on the same system, with techniques such as covert channel analysis, padding messages to disguise their actual characteristics, or by sending noise or spurious messages. However, such measures do not guarantee data security. Accordingly, there is a need for systems and methods to prevent data access in violation of security protocol to ports having a dominant classification in a multi-security level computer system. Such systems and methods must secure access to the dominant port to protect attribute information from compromise to an intruder.

Another technical problem relates to the transmission of security attributes, which are currently transmitted in binary form and not as part of the data stream to which the security attributes relate. This binary transmission of the security attributes is cumbersome and non-integrated with the transmission of the associated data, creating additional work and specialized code to synchronize and associate the data transmitted with the separately provided security data. Accordingly, it is desirable to integrate the transmission of data and the related security attributes, to reduce programming costs and the likelihood of errors.

SUMMARY OF THE INVENTION

According to one embodiment of the present invention, a security attribute system comprises a pointer structure to a stream attribute structure in turn pointing to a transmission structure identifying security credentials based upon data received or data transmitted. According to one embodiment of the present invention, security information from received data is entered into a credentials structure. Then, an attribute structure is established to point to the credentials structure. Finally, a pointer is established to identify the attribute structure.

According to the present invention, multilevel trusted systems associate multiple point endpoints with a single identifier code indication or name. Use of a single identification to associate multiple port endpoints enables provision of a security check which halts inter-endpoint communication when the endpoints are further associated with a common identifier code indication. This is beneficial because security breaches caused by interlevel communication are diminished. According to the present invention, use privileges for third-party communication at a selected network level are affirmatively granted at multiple specified levels. This is beneficial as it permits direct and unmodified application operation at desired multiple levels, permitting multilevel trusted system operation without applications software modification. According to the present invention, a computer system comprises a machine-readable program storage device embodying a program of instructions executable by the machine to perform method steps in a multilevel trusted system for establishing a multilevel port to enable multiple, substantially concurrent resource accessing. According to the present invention, a computer system comprises an operating system kernel supporting a multilevel access control security mechanism for creating an object access packet comprising an internet protocol (IP) header including a destination socket having a machine address and a unique port identifier, a port identifier comprising a port number specifying a resource or object, and a sensitivity label for an access control security protocol. According to the present invention, a plurality of processes are created on a destination system for a single selected port number at a selected unique sensitivity label, permitting resource and object access by multiple users in a multilevel access control system to a selected port according to a selected security policy. According to the method of this invention, machine readable code opens multiple instances of a selected application, both instances having the same port address and a separate sensitivity label. According to the present invention, multiple network endpoints having the same port number but separate security classification labels are established, permitting contemporaneous process port access according to a common port number while still adhering to the system security policy. As many ports may be open with the same port number as there are different security classifications used by the system access control security protocol.

DETAILED DESCRIPTION OF A BEST MODE OF THE INVENTION

Figure 1:
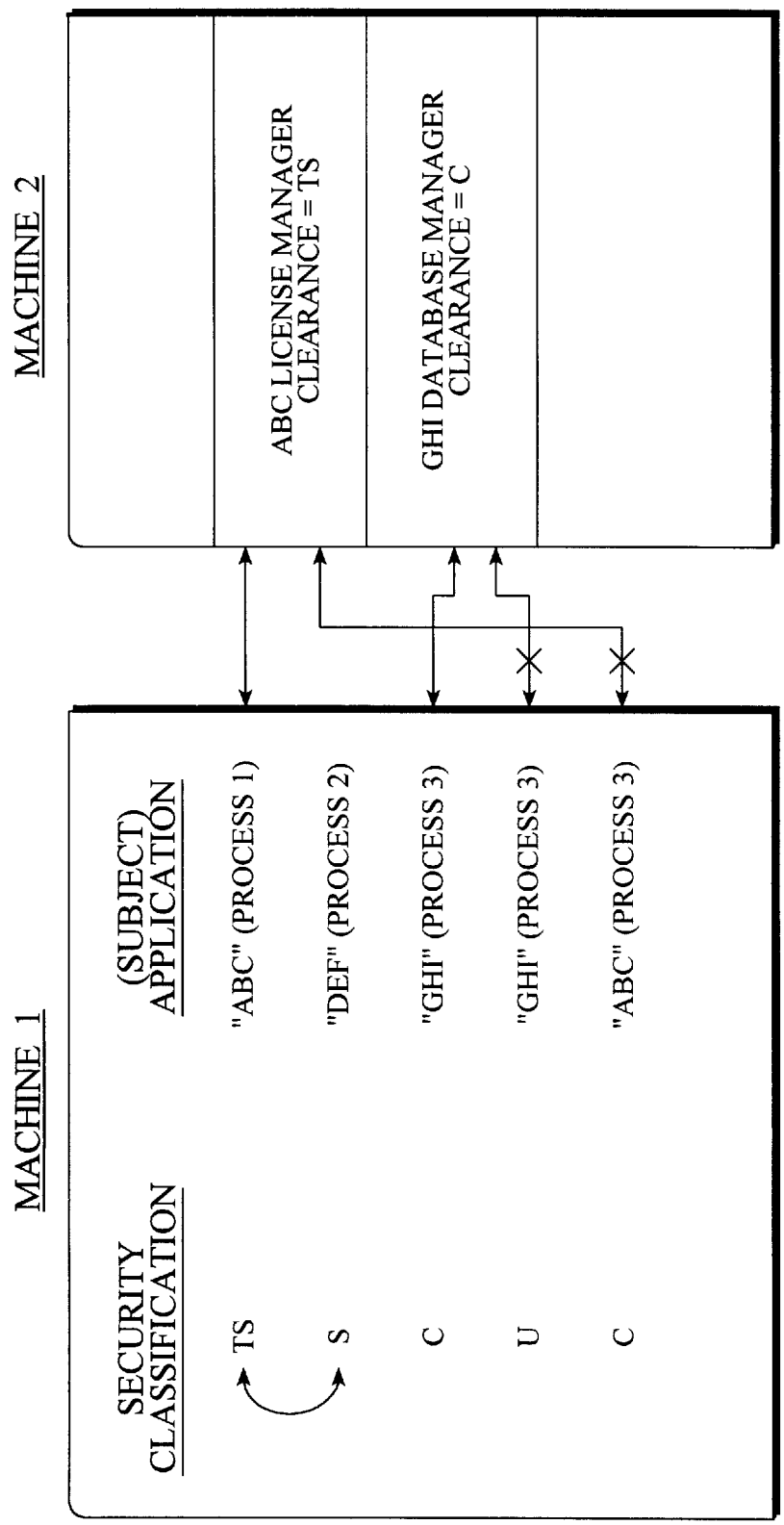
FIG. 1 is a block diagram of a multilevel trusted system having a plurality of ports and endpoints at predetermined security levels, according to the prior art.
Figure 2:
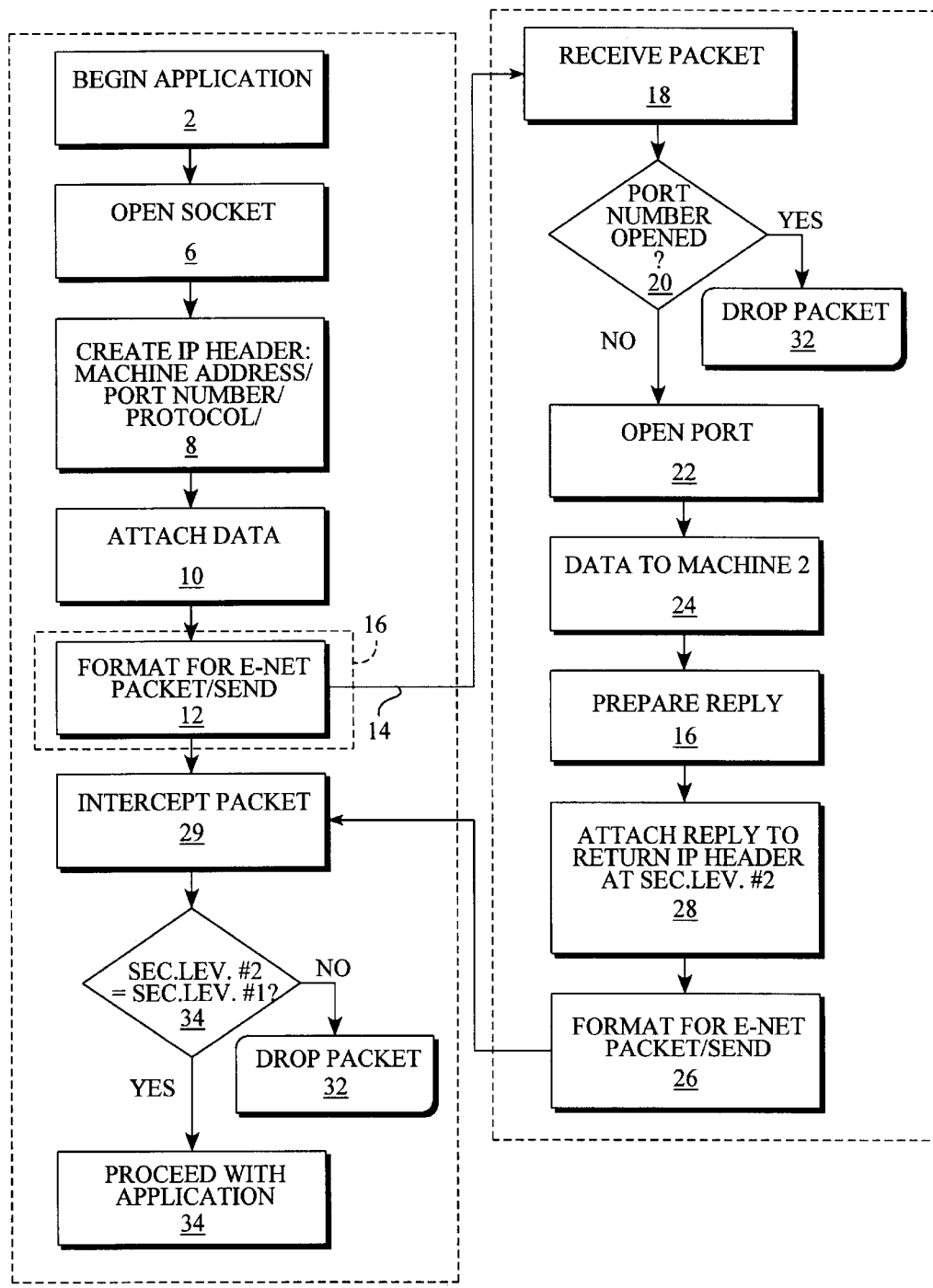
FIG. 2 is a flow diagram of a multilevel trusted system according to the prior art, in which a datagram or message packet is communicated between a source system and a destination system.

FIG. 2 is a flow diagram of a prior art system employing access control security mechanisms. Third party applications require a license verification from a remote third party computer system. Alternatively, license verification may be an object in a process operating on the same system as the process in which the application is running. Once an application is instantiated on a first operating system, it may determine that communication with an object process is required. The kernel on the first system accordingly creates 6 a socket, and constructs 8 a communications packet, including an appropriate header, a machine address, a port number, and a protocol identifier, attaches 10 a data and a sensitivity label continuing the clearance of the process under which the application is running, and transmits 12 through socket a data packet over a selected electronic communications medium.

An internet protocol (IP) header typically contains source system information for the system originating communication and information regarding the destination system. This information includes machine numbers of the source and the destination computers, the port numbers or addresses identifying applicable applications and services provided, and the protocol (e.g., TCP/IP, or UDP/IP) by which the two computers will communicate. Port numbers or addresses identify application or subject running on a client computer, and the application object or resource to be accessed on a destination machine such as a license verification program on a remote machine 13 or server.

During network communication, an IP header and data are electronically communicated 14 from the source system, through a socket endpoint for receipt 8 by a destination server. The destination kernel determines whether a requested port is available 20. If the port is available (i.e., not yet opened), the requested port opens 22 at a clearance level associated with the sensitivity label of the incoming communication. If the requested port number is in use, the request is dropped 32, possibly with a negative acknowledgment (NACK) being returned to the source server. The same classification level is required for two-way communication between a source system and a destination system under an access control security mechanism.

If a request is processed, the destination system opens 22 a port and prepares 16 a reply 16 and an IP header for the reply. An IP sensitivity label for the process under which the object application is running is additionally attached 28 to the reply. Under mandatory access control, the sensitivity label must contain the same security classification of the request of the originating system. The reply packet is further sent 26 to the originating server, where the packet is trapped 29 by the source kernel and inspected 30 pursuant to the security protocol for that system. If the reply packet is not provided at the same security level as the original request, the packet is dropped 32. Otherwise, the packet is passed-on 34 to the requesting application.

Figure 3:
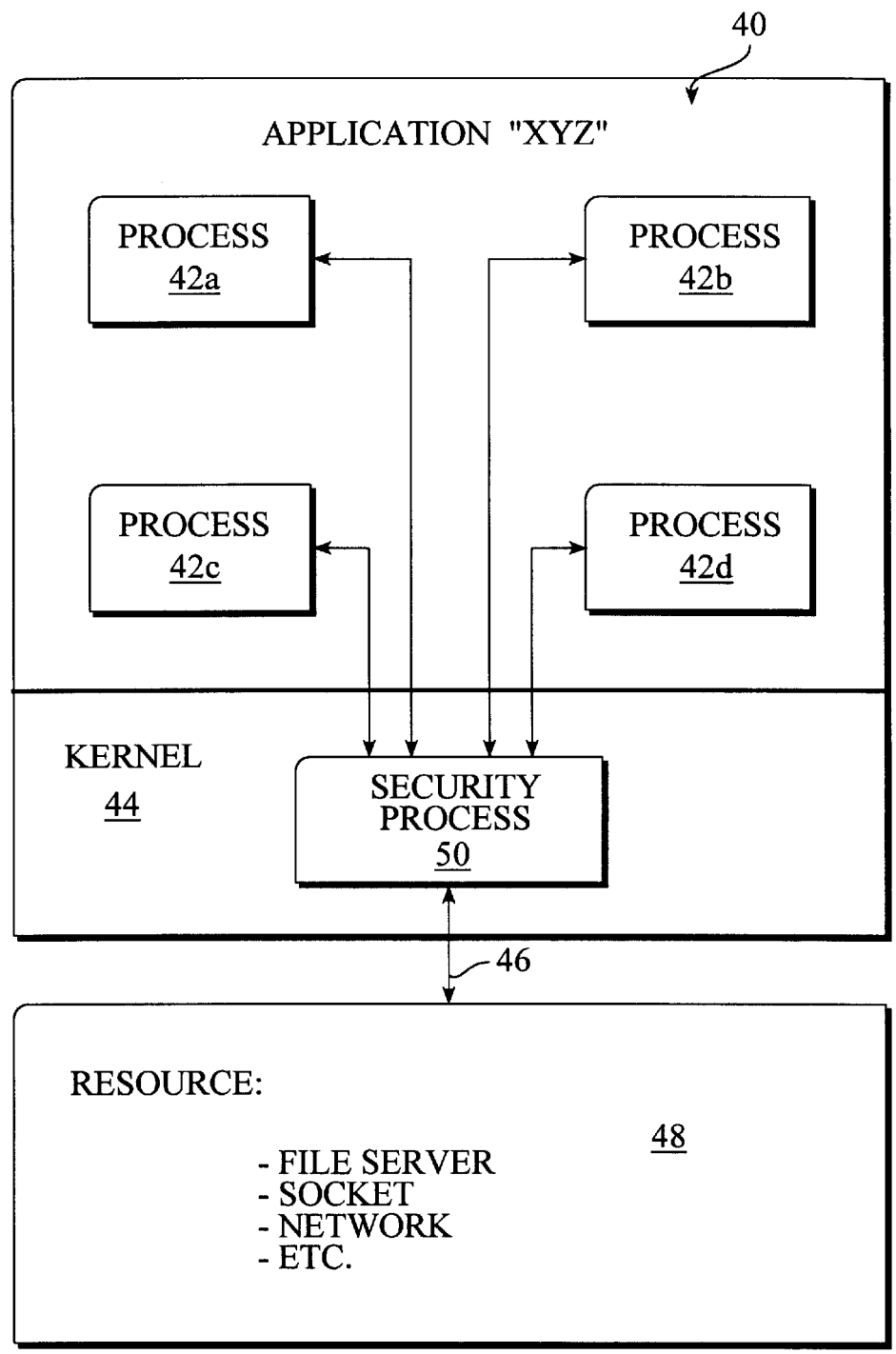
FIG. 3 is a block diagram of a security system according to the prior art.

FIG. 3 shows a multilevel trusted system according to the prior art, including first through fourth instances of the same selected application 40 running concurrently. The application instances of a running application are respective processes 42a–42d. Each of processes 42a–42d is assigned a particular security classification, and each process handles communication between application 40 and kernel 44. The assigned security classification, may be a predetermined clearance level based upon the identity of a user or a user category, or a type of application, for example. Kernel 44 controls input output functions, memory, processes, and operational aspects of running application 40. Kernel 44 mediates relationships 46 between processes of application 40 and selected resources 48, such as objects, services, and external application connecting to the processes of application 40. Kernel 44 includes a security process 50 ensuring that each process of application 40 communicates only with resources having a security classification consistent with a predetermined security policy. According to a mandatory access control (MAC) system, for example, security process 50 ensures that processes 42a–42d only communicate with resources 48 at the same security classification as the corresponding process of application 40. All MA objects are accordingly labeled with a security label which is used for communications packets traveling between the application process and the resource with which it has message traffic.

Figure 4:
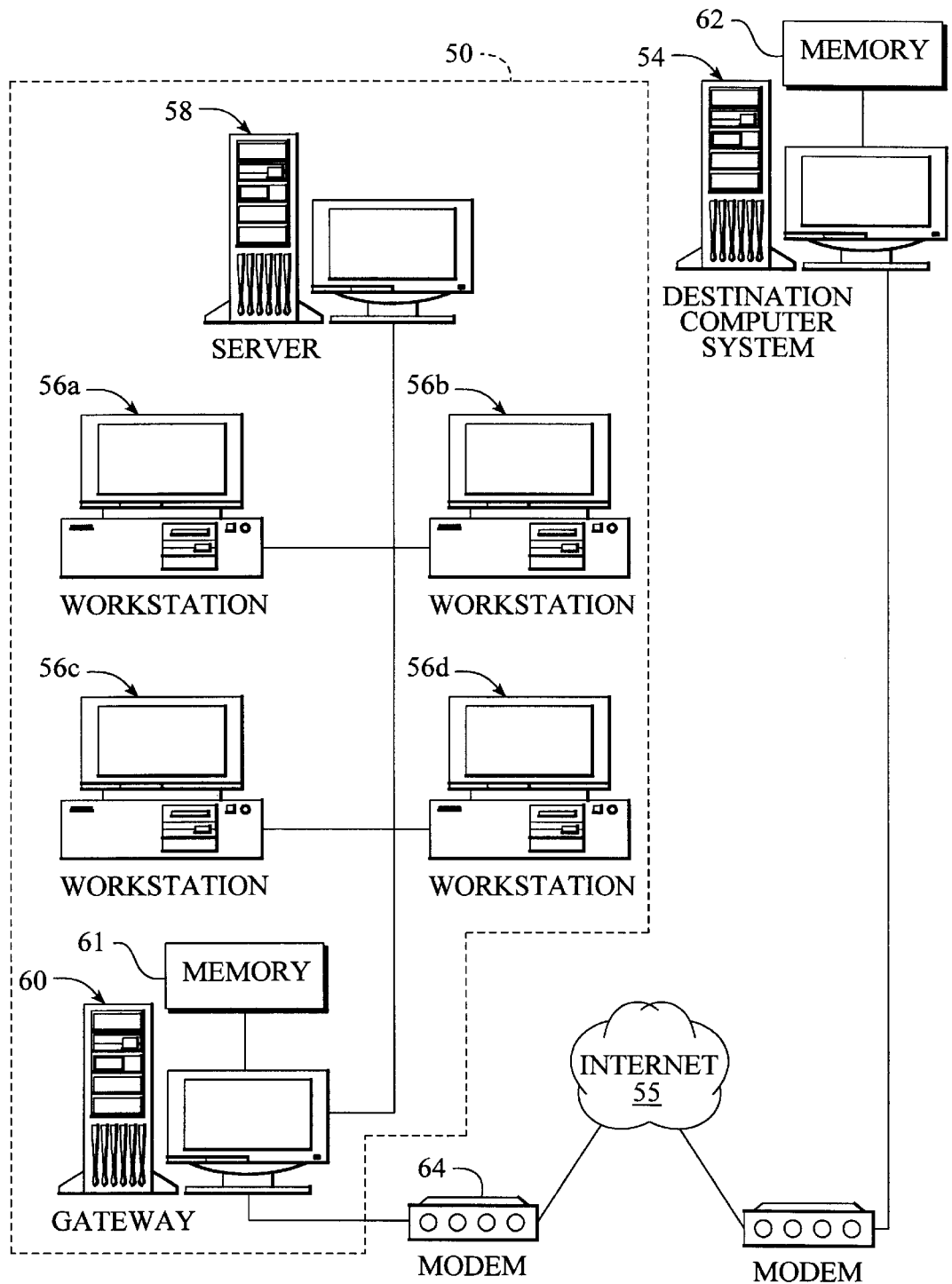
FIG. 4 is a diagram of an internet system according to the present invention.

FIG. 4 shows a multiuser, multilevel source trusted computer system 50 according to the present invention, which is networked to a second computer system 54 through a communication network 55, such as the internet. In a typical configuration, several users are networked into a server. Source trusted computer system 50 includes a network including a plurality of user workstations 56a–56, a server 58, and a gateway server 60, which may be employed as a firewall to prevent unauthorized access to source trusted computer system 50. The gateway server 60 includes a memory 61 for storing a kernel (not shown). The second computer system 54 includes a memory 62 for storing a kernel. For incoming messages, a security inspection is performed on incoming packets by the kernel (not shown) of gateway server 60. A received packet is passed into source trusted computer system 50 only after it has been determined that the packet has satisfied the security protocols of the source trusted computer system 50. In a multilevel trusted system using a mandatory access control security protocol, for example, the kernel of source trusted computer system 50 ensures that the sensitivity label of an incoming communications packet is the same as or higher than the sensitivity label of the destination process or port destination of computer system 54 to which the packet is addressed. If the packet security classification is not the same as or higher than the security classification destination port, then the packet is discarded from further processing. Message packets are sent through a modem 64 or a network interface card (not shown) over a selected transmission medium 62 formed of a copper wire, a fiber optic link, a microwave line, or a radio broadcast transmission link. The selected link with destination computer system 54 may be directly through a LAN connection, a direct phone link, or indirectly such as through the Internet. Upon reaching the destination computer system server, the message packet is intercepted by the server kernel (not shown). Should the destination server employ an OSI interface, the message packet is preferably analyzed at the lowest software level of the OSI stack, ensuring that the kernel examines the subelements of each message packet. In one embodiment, each workstation 86 couples through a modem 64 to the Internet 55, and includes a kernel that performs security.

Figure 5:
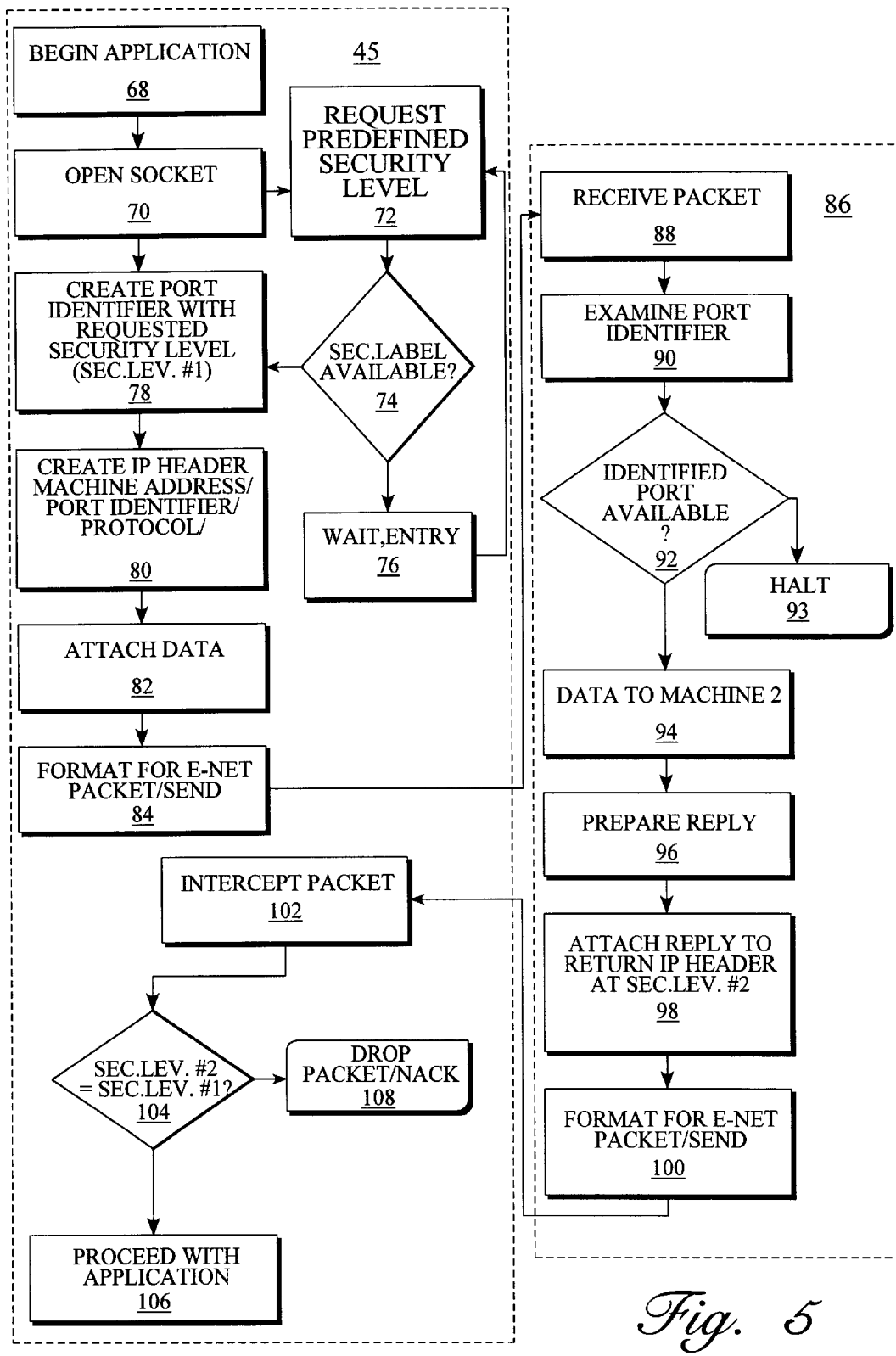
FIG. 5 is a flow diagram of a multilevel trusted system operation according to the present invention.

FIG. 5 is a flow diagram of a method for establishing multilevel ports according to the present invention in which a requesting application runs on a first data processing node 45 (i.e., Machine One). A second data processing node 86 (i.e., Machine Two) includes a plurality of ports associated with predetermined security classifications. According to the present invention, Machine One runs 68 a selected application, which establishes its own security level consistent with the security clearance of the user. When the application being run calls a resource or object at another data processing node, the local machine kernel opens 70 a socket to the other resource or object for which a message carrying a service request can be made. The socket identifies the destination machine, a port number corresponding to the application program being run, and the local process security level. A port identifier is created by first requesting 72 an applicable security level for the associated port number opened by the kernel. The kernel further checks to see if the requested port is available 74 at that security level. If that port number and security level combination is currently in use (e.g., by another user), the kernel waits 76 for a predetermined time before again polling to determine if the particular security level is available for the port number. On the other hand, if the particular port number and security classification combination is available, the kernel combines the security level and port number to create 78 a port identifier. Then, the applicable IP header for a message packet is created 80 by inserting the port number and security label combination into the protocol spaces of the IP header normally reserved for just the port number. The message packet is completed by attaching 82 application specific data and information into predetermined regions of IP header to create a complete datagram. The completed datagram packet is then formatted 84 for electronic communication and sent to the destination server 86.

The operating system kernel 86 of data processing node 86 intercepts 88 the packet from Machine One and examines 90 the subelements of the packet to extract the port identifier. Once the port number and security label have been extracted, the kernel determines whether the requested port at the specified security level is in open status, and if so, whether it is presently available 92 for access. If the port is unavailable in that the combined port number and sensitivity label is in use by another application, then the operation terminates 93. If the port is available, applicable data from the message packet is transferred 94 to the applications portion of the applicable operating system stack of data processing node 86 for application processing. After data is provided to the application, an applicable reply is prepared 96 as appropriate, and an applicable IP header is attached 98 to the reply message which is prepared. The reply message is formatted 100 for packet transmission over an electronic network, and sent to first data processing node 45.

The kernel of first data processing node 45 intercepts 102 the applicable reply packet and examines the packet to verify 104 that the reply message has been provided at the same security level as the applicable application process is running in data processing node 44. If the security levels of the local process and the remote message received are the same, the reply is passed 106 to the application for processing. If the reply is at a security level inconsistent with the security level of an applicable local application, the reply packet is terminated and, if applicable, a negative acknowledgment is sent 108 to the second data processing node 86. Although the reply packet examination shown in FIG. 5 indicates that the security level of the reply packet is the same or equivalent to the security level of the application process, according to the present invention, the reply packet may have a lower security level if the reply packet is to be read by the application. Any access controls may be used for receipt of message packets so long as the control is consistent with the system's security policy.

Figure 6:
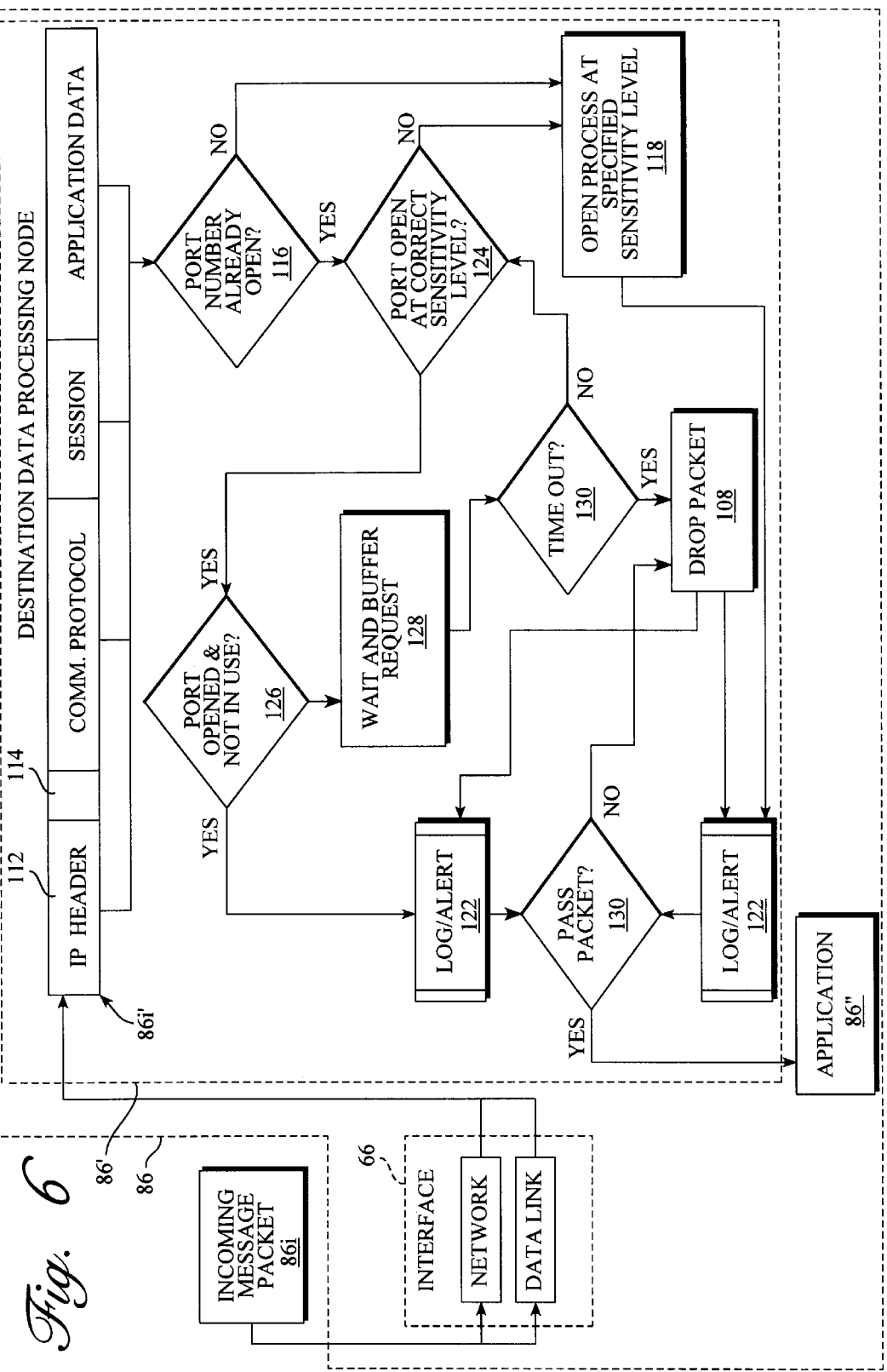
FIG. 6 is a diagram of a multilevel trusted system processing a communications packet according to the present.

FIG. 6 shows a method according to the present invention to determine whether a requested port is available for communication between data processing nodes. In particular, an incoming packet 86i is shown intercepted 110 by a destination system's operating system. Security examination is performed at the data link and network levels of the kernel interface operating system interface 66. The IP header element 112 of packet 86i' is examined and the port number and the security label subelement 114 are identified. The kernel checks to determine if the requested port number is already open 116. If not, the requested port is opened 118 at the security level indicated by the security label. Activities for opening a port at a particular security level are logged 122 to provide a journal or history of the activity and to provide a database or security levels which are presently open for particular port numbers. A decision is made 120 whether to pass the packet to a local application. If all other protocol requirements have been satisfied, the data is passed to the applications process 86" for handling and completion. If all other protocol requirements have not been satisfied, the packet is dropped 108. If a registered port number requested is already open 116, the operating system kernel determines 124 whether each opened port is at the security level specified by the port identifier's security label. If not, then a new port having the same number as the existing port is opened 118 at the identified security level. The opening of the port is logged 122 to journal the activity, as described above. If the existing open port is at the same security level as identified in the port identifier subelement, then it is determined 126 whether the port is in use. If the port is presently in use, then a mandatory access control protocol precludes opening another port at the same number and security level being opened. Consequently, a packet is either buffered 128 and checked periodically until a pre-defined time-out 130 occurs, causing packet process termination or the packet is terminated 108 immediately, or until the port becomes unused 124, 125. If an open port is set to a correct security level but not currently in use 126, then the port activity is logged and a decision is made 120 whether or not to pass the packet. If all other security criteria is met, the packet is forwarded for application processing.

Figure 7:
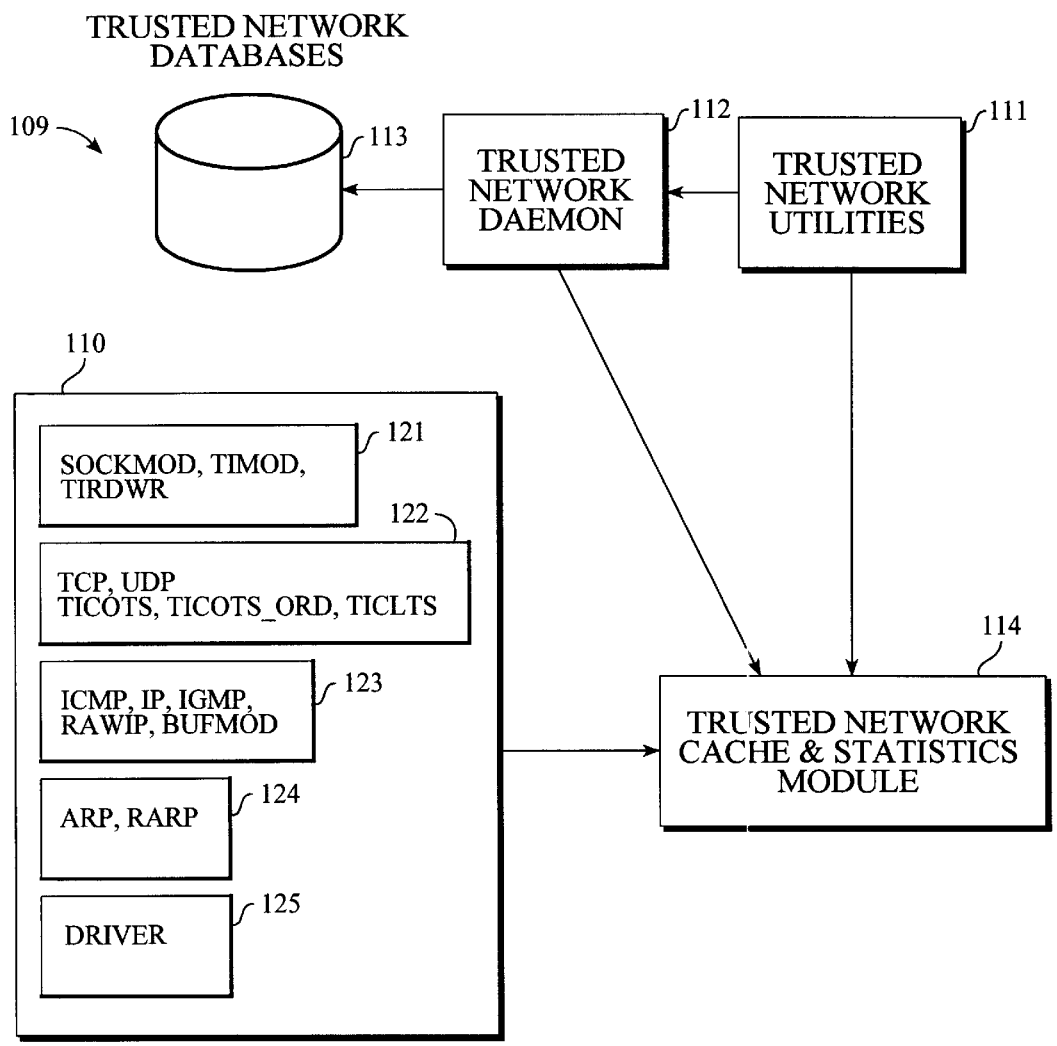
FIG. 7 is a block diagram of trusted network components used in connection with an embodiment of the present invention for operation with the kernel.

FIG. 7 is a block diagram of trusted network components 109 used in connection with an embodiment of the present invention for operation with the kernel. In particular, the trusted network components 109 includes a first set 110 of multiple trusted network components, trusted network utilities 111, a trusted network daemon 112, a plurality of trusted network databases 113, and a trusted network cache and statistics module 114 for operation with the kernel 115. The first set 110 of multiple trusted network components includes a plurality of multiple trusted network components including sockmod, timod, and tirdwr elements 121; TCP, UDP, ticots, ticots_ord, and ticlts elements 122 for supporting the indicated protocols; ICMP, IP, IGMP, RAWIP, and bufmod elements 123; arp, and rarp elements 124; and a driver 125. The first 110 of trusted network components is provided to the trusted network cache and statistics module 114 for trusted network operation. The trusted network daemon 112 operates on the plurality of trusted network databases 113 and the trusted network cache and statistics module 114. Additionally, the trusted network utilities 111 operate with the trusted network daemon 112 and the trusted network cache and statistics module 114. The trust network components 109 are responsible for propagating security attributes across the network and to make these security attributes available for distributed applications according to the present invention. The trusted network databases 113 according to the present invention are configured by an administrator to enable each machine on the network and each network interface on a local machine to operate within a range of sensitivity levels. The trusted network utilities 111 according to the present invention send control and configuration information to the kernel 115 and retrieve kernel statistics from the trusted network. When the kernel 115 needs information from the trusted network databases 113, it does not directly read the trusted network databases 113 according to the present invention. Instead, the trusted network cache and statistics module 114 maintains a kernel cache of database information. The trusted network cache and statistics module 114 is loaded with initial database information at boot time. When there is an update to any trusted network database 113, the trusted network daemon 112 is notified and it interacts with the trusted network cache and statistics module 114 to update the kernel cache. According to the present invention, each byte of network data is associated with security attributes including a sensitivity label, an information label, flags indicating effective ones of restricted operations permissible for a process, a session clearance, a kernel process ID, and an effective user ID.

Figure 8:
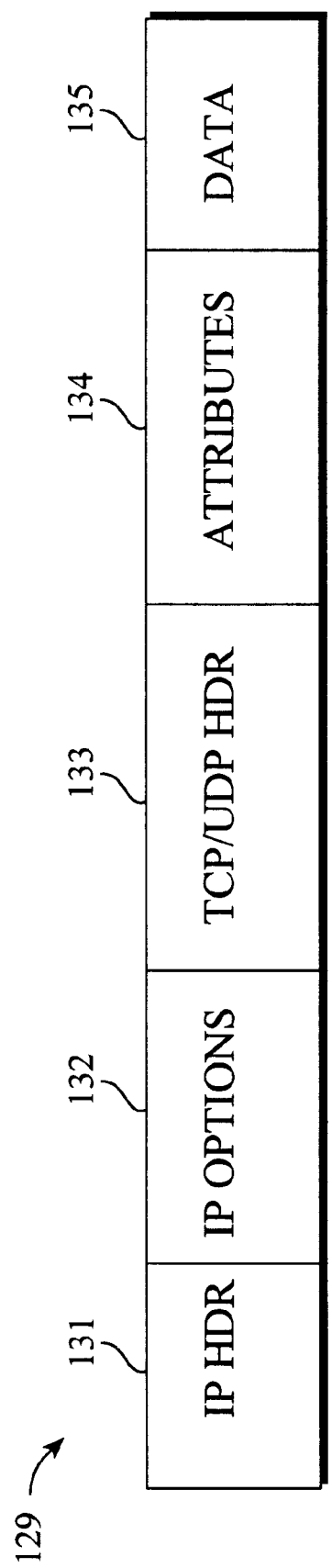
FIG. 8 is a diagram of the packet format used in a trusted Solaris system according to one embodiment of the present invention.

FIG. 8 is a diagram of the packet format 129 used in a trusted Solaris system according to one embodiment of the present invention. In particular, the packet format 129 includes an internet protocol (IP) header 131, IP options 132, a TCP/UDP header 133, security attributes 134, and user data 135. The attributes according to one embodiment of the present invention are either an attribute header and a list of attributes, or a null attribute header.

Figure 9A:
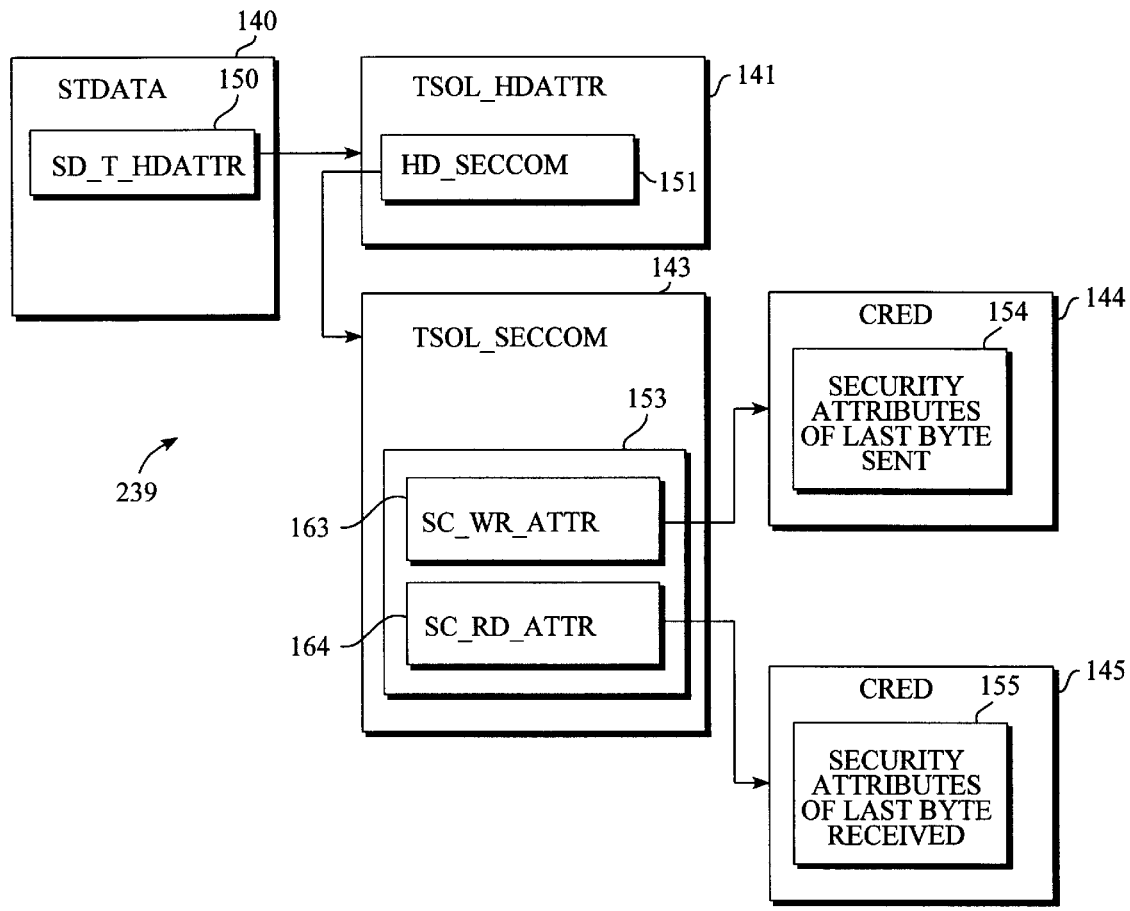
FIG. 9A is a diagram of a system for endpoint security related in function according to one embodiment of the present invention.

FIG. 9A is a diagram of a system 139 for endpoint security for operation according to one embodiment of the present invention. In particular, the TCP (i.e., transport control protocol) security attribute stream linking system 139 includes a stream head structure 140, a stream attribute structure 141, a security attribute transmission structure 143, and first and second credentials structures respectively 144 and 145. The stream head structure 140 (stdata) includes a pointer 150 (sd_t_hdattr) which points to the stream attribute structure 142 (tsol_hdattr). The stream attribute structure 141 in turn includes a pointer 151 (hd_seccom) which points to the security attribute transmission structure 143. The security attribute transmission structure 143 includes a linking pointer structure 153 including first and second pointers 163 and 164 (respectively sc_wr_attr and sc_rd_attr). The first pointer 163 points to first credentials structure 144, and the second pointer 164 points to the second credentials structure 145. The first credentials structure 144 includes the security attributes 154 of the last byte of information sent, and the second credentials structure 145 includes the security attributes 155 of the last byte of information received. Streams is a collection of system cells, kernel resources, and kernel utility routines that can create, use and dismantle a stream. A stream is full duplex data transferred in a pathed information communications process between a kernel driver and a user process. A stream includes the kernel stream end driver as well as the user side stream head.

Figure 9B:
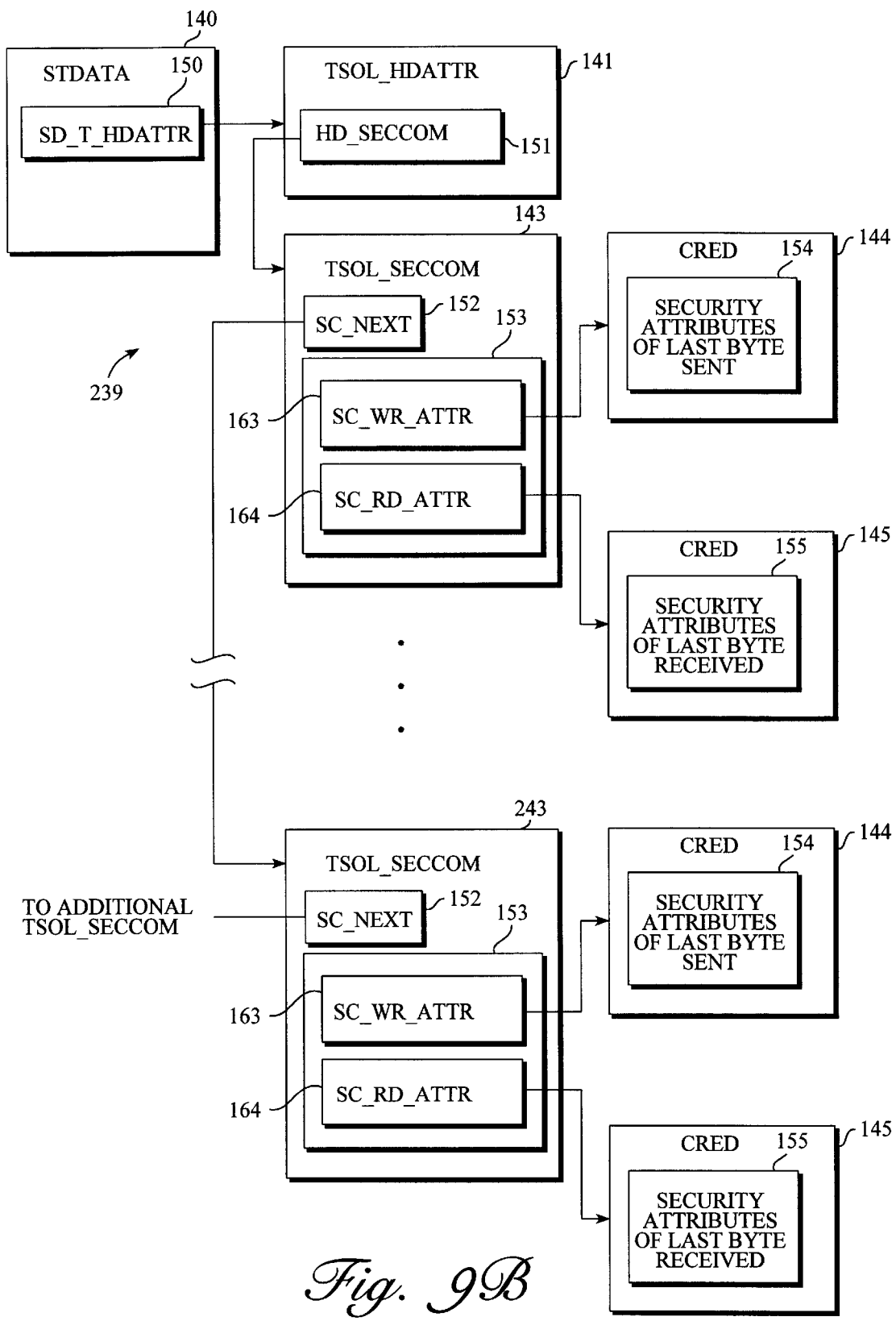
FIG. 9B is a diagram of a UDP system for endpoint security related in function according to one embodiment of the present invention.

FIG. 9B is a diagram of a UDP system for endpoint security for operation according to one embodiment of the present invention. The UDP security attribute stream linking system 239 according to one embodiment of the present invention includes a stream head structure 140, a stream attribute structure 141, and a plurality of linked security attribute transmission structures 143, 243, etc., each having pointers to associated first and second credentials structures respectively 144 and 145. The stream head structure 140 (stdata) includes a pointer 150 (sd_t_hdattr) which points to the stream attribute structure 141 (tsol_hdattr). The stream attribute structure 141 in turn includes a pointer 151 (hd_seccom) which points to a security attribute transmission structure 143. The security attribute transmission structure 143 includes a linking pointer structure 153 including first and second pointers 163 and 164 (respectively sc_wr_attr and sc_rd_attr). The first pointer 163 points to first credentials structure 144, and the second pointer 164 points to the second credentials structure 145. The first credentials structure 144 includes the security attributes 154 of the last byte of information sent, and the second credentials structure 145 includes the security attributes 155 of the last byte of information received. Linking pointer 152 points to the second security attribute structure 243 which has pointers associated with first and second associated credentials structures 144 and 145 and according to one embodiment of the present invention another linking pointer 152 to yet another security attribute structure which in turn has its own first and second associated credentials structures 144 and 145.

Figure 10:
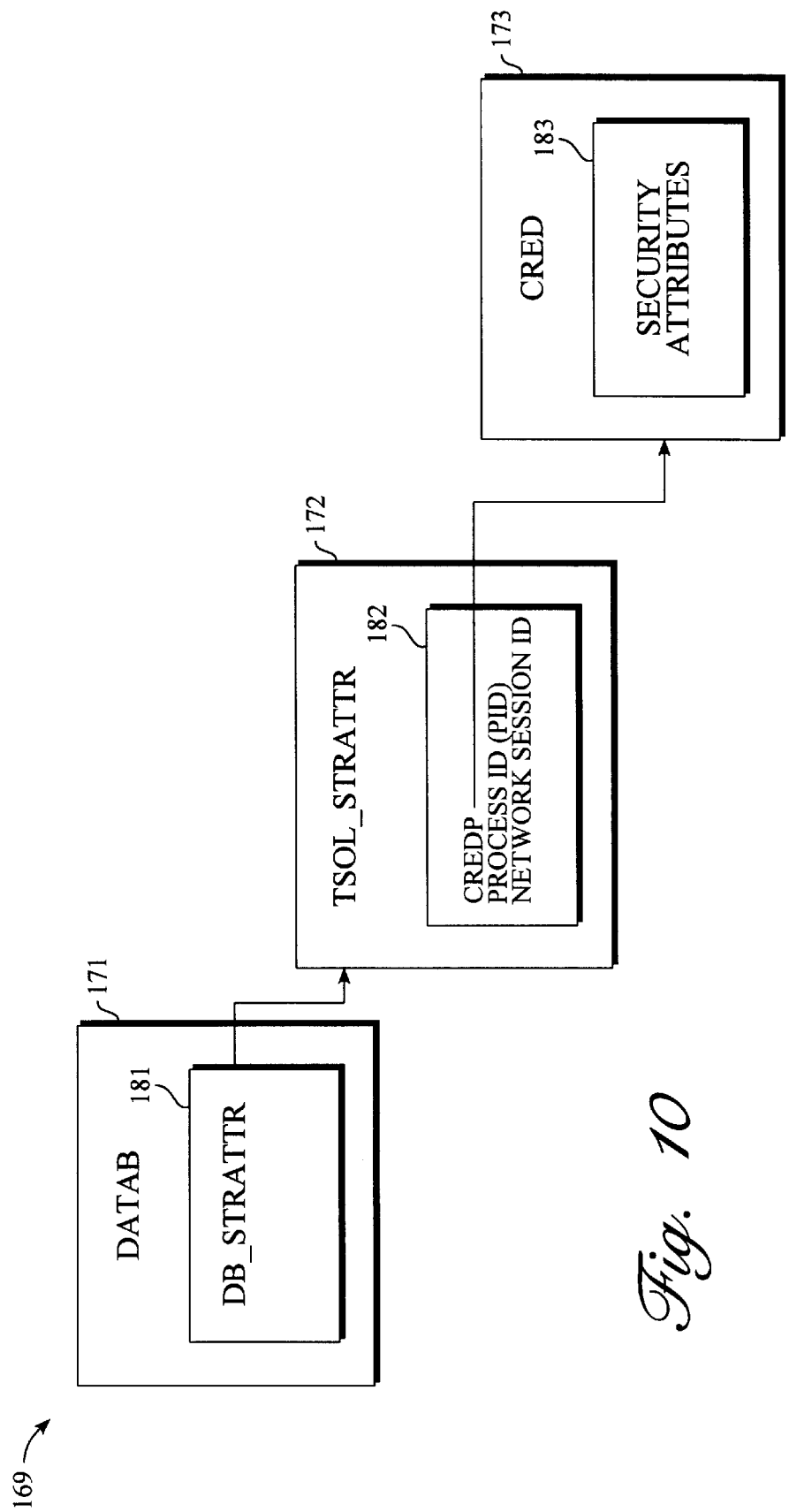
FIG. 10 is an association diagram illustrating a data security attribute linkage system 169 of security attributes with selected data with an intervening stream attribute structure according to the present invention.

FIG. 10 is an association diagram illustrating a stream data security attribute linkage system 169 for security attributes of selected data having an intervening stream attribute structure according to the present invention. In particular, data security attribute linkage system 169 includes a stream data block structure 171, a stream attribute structure 172, and a credential data structure 173. The stream data block structure 171 includes a pointer 181 (db_strattr) which points to stream attribute structure 172. The stream attribute structure 172 includes information 182 including a credentials pointer (Credp), a process identifier (PID), and a network session ID. The credentials pointer (Credp) points to the credentials structure 173 which includes security attributes 183. Accordingly, security attributes are associated with network data in a stream according to the present invention. For outgoing data, the security attributes 183 are stored in the credentials structure 173. The stream head sets the stream data block structure 171 to point to the stream attribute structure 172, which in turn points to the credentials structure 173 holding the security attributes 183 for the outgoing data. Thus, the security attributes 183 are accessible to remote network modules which desire to perform accreditation checks on the received data. In particular, when a packet is received incident to a stream process, the security attributes from the received packet are copied into a credentials structure 173. Additionally, a stream attribute structure 172 is set up to point to the credentials structure 173, making available the security attributes 183 as the data flows upstream, and enabling retrieval of the security attributes by trusted applications to examine the attributes of data received.

What is claimed is:

1. A security attribute system comprising:
a communication stream endpoint structure having an endpoint pointer;
a stream attribute structure having a stream attribute pointer, said endpoint pointer configured to point at said stream attribute structure;
a security attribute transmission structure having a first pointer, said stream attribute pointer being configured to point at said security attribute transmission structure; and
a first credentials structure configured for storing security attribute information associated with a stream process, said first pointer of said security attribute transmission structure being configured to point to said first credentials structure.

2. The security attribute system according to claim 1 wherein said security attribute transmission structure further includes a second pointer being configured to point to a second credentials structure.

3. The security attribute system according to claim 2 said second credentials structure having security attributes for a byte received during stream communication.

4. The security attribute system according to claim 1 wherein said first credentials structure includes security attributes for a byte sent during stream communication.

5. The security attribute system according to claim 1 wherein said first credentials structure includes security attributes for a byte sent during stream communication and wherein the security attribute transmission structure further includes a second pointer being configured to point to a second credentials structure that includes security attributes for a byte received during stream communication.

6. The security attribute system according to claim 1 wherein said security attribute transmission structure includes a next pointer being configured to point to a second security attribute transmission structure.

7. A system for associating security attribute with selected data to be transmitted, comprising;
    a data structure associated with data to be transmitted, said data structure having a first pointer;
    a stream attribute structure having a stream attribute pointer, said first pointer configured to point at said stream attribute structure, and
    a credentials structure configured for storing security attribute information associated with a stream process, said stream attribute pointer being configured to point at said credentials structure.

8. A method of receiving data having security information in the system of claim 6, comprising:
    copying the security information from the received data into the credentials structure;
    setting up said stream attribute structure to point to said credentials structure; and
    setting said first pointer to point to said stream attribute structure.

9. The method as recited in claim 8, wherein the data is a data packet.

10. The method as recited in claim 8, wherein said stream attribute structure includes a stream process identifier.

11. The method as recited in claim 8, wherein said stream attribute structure includes a network session ID.

12. A method of specifying security information associated with a communication stream, comprising:
    storing security attributes of data being transmitted in the communication stream into a selected data structure;
    establishing a transmission structure for containing at least a single pointer to said selected data structure for storing said security attributes; and
    setting a pointer from a stream data block associated with the data to said transmission structure such that the data transmitted in said communication stream is associated with said security attributes.

13. A computer program product comprising a computer useable medium storing thereon computer readable instructions, comprising:
    computer readable code for constructing a data structure associated with data to be transmitted, said data structure having a first pointer;
    computer readable code for constructing a stream attribute structure having a stream attribute pointer, said first pointer configured to point at said stream attribute structure; and
    computer readable code for constructing a credentials structure adapted for storing security attribute information associated with a stream process, said stream attribute pointer being configured to point at said credentials structure.

14. A computer program product comprising a computer readable medium storing thereon computer readable instructions comprising:
    computer readable code for constructing a communication stream endpoint structure having an endpoint pointer;
    computer readable code for constructing a stream attribute structure having a stream attribute pointer, said endpoint pointer configured to point at said stream attribute structure;
    computer readable code for constructing a security attribute transmission structure having a first pointer, said stream attribute pointer being configured to point at said security attribute transmission structure; and
    computer readable code for constructing a first credentials structure configured for storing security attribute information associated with a stream process, said first pointer being configured to point to said first credentials structure.

* * * * *